Nov. 12, 1963 L. N. ROBERTS 3,110,367
HYDRAULIC CUSHIONING DEVICE FOR RAILWAY VEHICLES
Filed March 16, 1962 2 Sheets-Sheet 1

INVENTOR
LESLIE N. ROBERTS
BY
ATTORNEY

Nov. 12, 1963   L. N. ROBERTS   3,110,367
HYDRAULIC CUSHIONING DEVICE FOR RAILWAY VEHICLES
Filed March 16, 1962   2 Sheets-Sheet 2
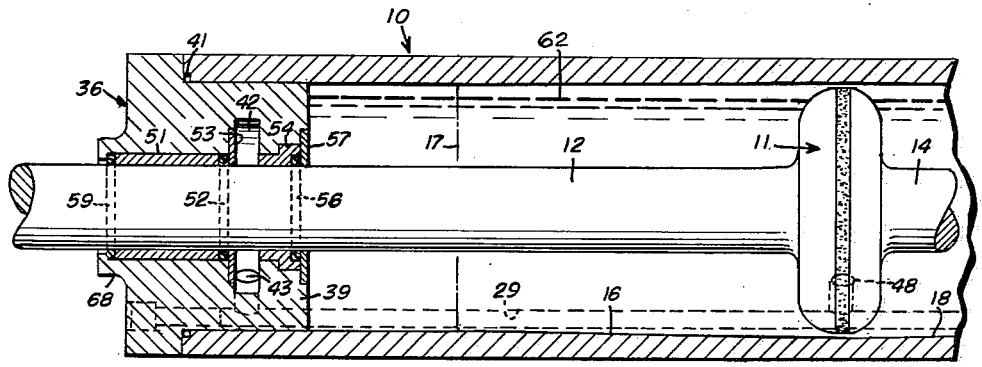
FIG. 6
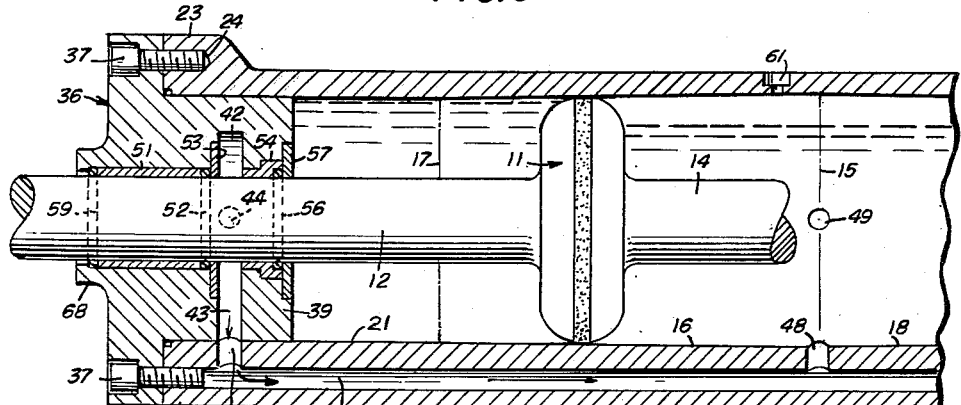
FIG. 7
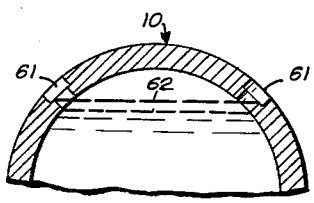
FIG. 8
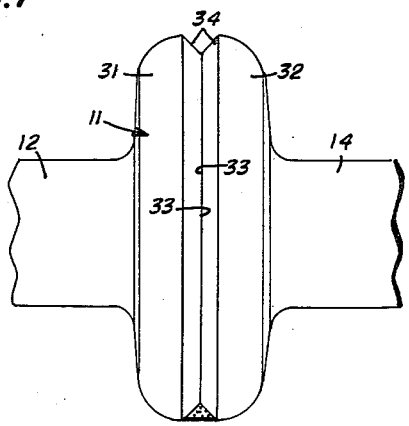
FIG. 9
INVENTOR.
LESLIE N. ROBERTS
BY
ATTORNEY

United States Patent Office 3,110,367
Patented Nov. 12, 1963

3,110,367
HYDRAULIC CUSHIONING DEVICE FOR RAILWAY VEHICLES
Leslie N. Roberts, Columbus, Ohio, assignor to The Buckeye Steel Castings Company, Columbus, Ohio
Filed Mar. 16, 1962, Ser. No. 180,162
6 Claims. (Cl. 188—96)

The present invention relates to a hydraulic device which comprises a cylinder and piston assembly wherein movement of liquid is metered upon relative movements of the piston and cylinder and the device has particular utility in association with the underframe of a railway vehicle such as a freight car to absorb impacts applied to the couplers.

The railroads have been using various mechanisms in association with the underframe of freight cars to cushion the impacts applied to one or both couplers to prevent the impact energy from being applied to the car body and the load carried by the vehicle. Such cushion mechanisms when they are of the hydraulic type effectively reduce damage to the lading and it is an object of the present invention to provide improvements in a hydraulic device for such purposes and to provide a cylinder and piston assembly which will serve to cushion relative movements of the piston and cylinder in either direction and to convert the kinetic energy of an impact into heat as the liquid is forced through an orifice during a stroke of the piston relative to the cylinder.

A more specific object of the invention is to provide a hydraulic device which includes a piston and cylinder which may be readily constructed with a minimum of manufacturing steps and to provide an assembly which may be applied to various types of railway car underframes and to provide a novel piston and piston rod assembly and structure providing effective orifice means and to simplify the structure providing passage means for the return of any liquid which may tend to escape along the piston rods.

Other objects and features of the invention will be appreciated and become apparent to those skilled in the art to which the invention pertains and to those acquainted with cushion mechanisms for the couplers of railway vehicles and additional objects and advantages will be appreciated upon consideration of the following detailed description taken in conjunction with the accompanying drawings wherein an embodiment of the invention is disclosed.

In the drawings:

FIG. 6 is a longitudinal sectional view of a portion of the assembly and taken on the line 6—6 of FIG. 2.

FIG. 7 is a longitudinal sectional view taken on the line 7—7 of FIG. 2.

FIG. 8 is a fragmentary sectional view taken on the line 8—8 of FIG. 1.

FIG. 9 is an enlarged side elevation of the piston and piston rod assembly.

The invention is directed to a hydraulic device which includes a tubular housing member or cylinder 10 of suitable length which is greater than twice the length of a stroke of one underframe member of a railway car in relation to another underframe member in absorbing the energy of an impact applied to either coupler.

The hydraulic device includes a piston 11 which is arranged intermediate the ends of the cylinder in the inactive position of the assembly. A piston rod 12 carried by the piston 11 extends beyond one end of the cylinder and a piston rod 14 extends beyond the other end of the cylinder. The hydraulic device comprises essentially a piston and cylinder which is designed to serve as a cushion mechanism for absorbing impacts applied at either end of the railway vehicle and the hydraulic device is of the double ended double acting type.

Figure 3:
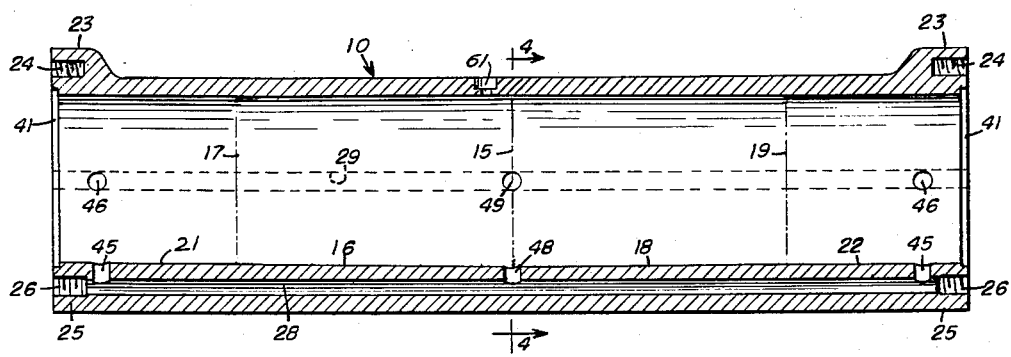
FIG. 3 is a longitudinal sectional view of the tubular housing member with other elements omitted and taken on the line 3—3 of FIG. 5.
Figure 4:
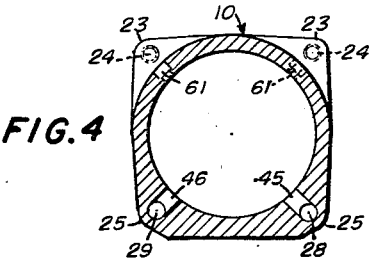
FIG. 4 is a transverse sectional view taken on the line 4—4 of FIG. 3.

The tubular housing member 10 is substantially of cylindrical formation and the exterior of the upper half is generally of cylindrical shape between the end portions as shown in FIGS. 3 and 4. The lower portion of the tubular housing member 10 has a thickened wall structure to provide structure for accommodating return passages for liquid as hereinafter described. The inner surfaces within the tubular housing member 10 are best shown in FIG. 3 and while the interior is substantially cylindrical shaped the maximum inside diameter is adjacent a transverse plane 15 which is located at substantially equal distances between the ends of the tubular housing member. An inner annular surface tapers inwardly in proceeding towards each end of the tubular housing member from the plane 15. One conical surface 16 terminates near one end of the tubular housing member and at the transverse plane 17. The inner annular surface 18 in proceeding towards the other end from the plane 15 tapers inwardly at the same rate or angle as the surface 16. The conical surface 18 terminates near the second end of the tubular housing member and at the transverse plane 19 as shown in FIG. 3. These conical surfaces 16 and 18 cooperate with the perimeter of the piston 11 (FIG. 6) to form orifices which meter movement of liquid within the device during relative movements of the tubular housing member and piston. The orifice areas vary between a maximum at the plane 15 to a minimum at the plane 17 or 19. Inner annular surfaces 21 and 22 outwardly beyond the conical surfaces are desirably of cylindrical shape to facilitate closure of the ends of the working chambers as hereinafter described.

Figure 5:
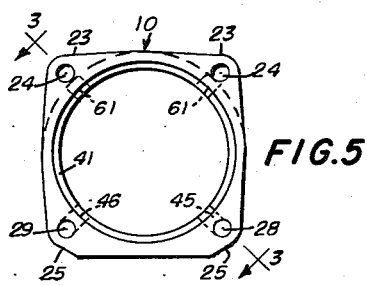
FIG. 5 is an end view of the tubular housing member.

Each end of the upper portion of the tubular housing member 10 is provided with circumferentially spaced ears 23 as best shown in FIGS. 3 and 5 which are provided with threaded openings 24 for receiving fastening means such as cap screws. Each end of the lower portion of the tubular housing member 10 is provided with circumferentially spaced enlargements 25. The wall of the tubular housing member 10 in the longitudinal areas of each enlargement 25 has increased thickness throughout the length thereof to provide structure for accommodating two passages 28 and 29 which extend from one end to the other of the tubular housing member as shown in FIGS. 3 and 5. The passages 28 and 29 have threaded end openings 26 for receiving the fastening means.

The structure of the piston 11 and one method by which it can be constructed will be understood from a consideration of FIG. 9. The piston is formed of two disc-shaped members 31 and 32 formed integral with the respective piston rods 12 and 14. The confronting faces 33 of these disc-shaped members each have a plane surface which is disposed at right angles to the axis of the piston rods. A chamfered surface 34 is provided at the perimeter of each disc member to provide a V-shaped groove at the circumference of the assembled disc-shaped members. Weld metals applied within this V-shaped groove serves to join the disc-shaped members and to unite them and their piston rods into a unitary structure. Finishing of the perimeter of the piston serves to provide a peripheral surface on the piston which is only slightly less than the diameter of the cylindrical surfaces 21 and 22. The piston 11 has a diameter which is less than the inner surface of the tubular housing member at the plane 15. The piston 11 with the integral piston rods 12 and 14 forms an assembly which is arranged within the tubular housing member 10 with the piston 11 arranged substantially at the mid-point of the device so that the piston rods 12 and 14 project beyond the opposite ends of the assembly. Any suitable method may be used to construct the piston and piston rod assembly such as machining it to finished dimensions from a single integrally formed forging or casting. The piston and piston rod assembly may be formed by assembling it from separately formed piston and piston rod parts suitably secured together to form the proper assembly.

Figure 2:
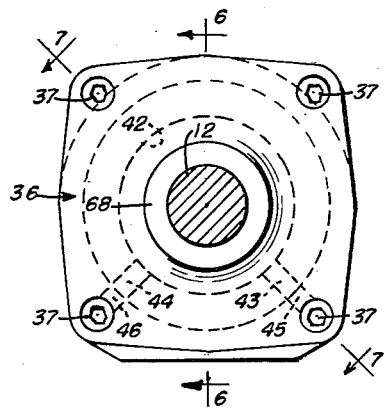
FIG. 2 is an end view of the device on a larger scale and taken on the line 2—2 of FIG. 1.

A head member 36 closes one end of the tubular housing member and a similar head member closes the other end thereof. The head members are of similar construction and a description of one will serve to provide an understanding of the manner in which both ends of the device are closed and the structure which supports and guides the piston 11 and the piston rods 12 and 14 in relation to the tubular housing member. The head member 36 has a generally rectangular shape viewed in end elevation as will be apparent from a consideration of FIG. 2. It is provided with holes through which fastening means 37 extend for introduction in the threaded holes 24 and 26 and thereby secure the head member in fixed relationship with the end of the tubular housing member 10. A central projection 39 on the head member 36 fits snugly within the associated cylindrical portion 21 of the tubular housing member. An annular gasket 41 which may be an O-shaped ring and formed of resilient material such as synthetic rubber or plastic is accommodated within an annular recess formed in the tubular housing member. The gasket 41 is clamped between an end of the housing member and an annular flange on the head member 36.

An annular channel 42 is provided in each head member 36 within the projection 39. A pair of radially extending ducts 43 and 44 are provided within the head member which extend downwardly therefrom. These ducts are in communication with the annular channel 42. The duct 43 registers with an opening 45 in the wall of the tubular housing member 10 and the other duct 44 registers with an opening 46 formed in the wall of the tubular housing member. The longitudinally extending passages 28 and 29 are formed in thickened portions of the wall of the tubular housing member 10. The opening 45 is in communication with the passage 28 and the opening 46 is in communication with the passage 29. A radially disposed opening 48 extends from the passage 28 into the interior of the tubular housing member at the mid-point along the length thereof. A similar radial opening 49 provides communication from the other longitudinally extending passage 29 into the interior of the tubular housing member adjacent the plane 15.

A bushing 51 surrounds the piston rod 12 within the head member 36. A seal ring 52 is provided at the inner end of the bushing 51 and this seal ring may be formed of metal fitting closely about the periphery of the piston rod 12. A disc-shaped retainer ring 53 is accommodated in a recess in the head member at one side of the annular channel 42 and is secured to the head member in any suitable manner and retains the bushing 51 and the seal ring 52 in position. Another bushing 54 surrounds the piston rod 12 and is mounted within the head member 36. A two-piece seal ring 56 is accommodated in an annular groove formed in the inner end of the bushing 54. A retaining ring assembly 57 maintains the bushing 54 and the seal ring 56 in position. A wiping ring 59 is provided at the outer end of the bushing 51 which serves to clean the piston rod 12 as it enters the cylinder. The gasket 41 forms a static seal between the end of the tubular housing member 10 and the head member 36.

When the head members are in place the device may be filled with a suitable liquid through fill openings 61 which are formed in the upper central portion of the tubular housing member. One fill opening 61 is arranged at one side of the plane 15 while the other opening is arranged at the opposite side thereof. When the piston 11 is in the neutral position the liquid finds its way into the chambers at each side of the piston 11. The axes of the fill openings 61 are desirably displaced from the vertical by about thirty-nine degrees so that the device may not be filled above a level indicated at 62 in FIG. 8. This arrangement provides unoccupied space into which the liquid may expand as a consequence of a rise in the temperature thereof. The fill openings 61 may be closed by threaded plugs.

In operation and when there is movement of the piston 11 towards either end of the tubular housing member such as to the left in FIG. 6 the liquid develops pressure on the head member 36 and the bushing 54 together with the seal ring 56 serve to prevent outward movement of the liquid along the periphery of the piston rod 12. If leakage does occur the liquid moves into the annular channel 42. This liquid can then move into the radial ducts 43 and 44 and drains through the openings 45 and 46 and into the respective longitudinally extending passages 28 and 29. The liquid may then return to the interior of the tubular member through the openings 48 and 49 which are then located at the opposite side of the piston 11 and on the low pressure side thereof. The bushings and sealing rings in association with the cylinder head outwardly of the annular channel 42 provide further safeguards against the leakage of liquid from the device. The seal ring 52 and the bushing 51 on the low pressure side of the annular channel 42 serve effectively to avoid escape of liquid along the perimeter of the piston rod 12.

Figure 1:
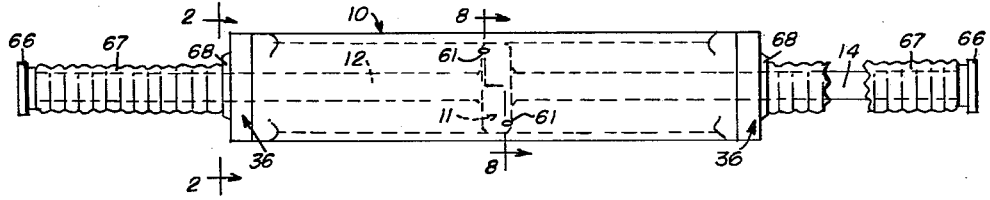
FIG. 1 is a plan view of a hydraulic device embodying

The free end of each piston rod may be provided with a cap member 66 which serves to prevent mushrooming of the free ends of the piston rods as a result of impacts of lugs or stop members carried by one underframe member. A flexible bellows 67 may be provided in surrounding relationship with each piston rod as shown in FIG. 1. These bellows type boots may be fastened to the piston rod cap members and the annular shoulders 68 on the outer ends of each head members 36. Lugs or stop members carried by another member of the underframe engage the outer surfaces of the head members 36.

The tapering of the interior surface 16 of the tubular housing member in the area between the plane 15 and the plane 17 provides an annular orifice which is formed by the clearance between the periphery of the piston 11 and the inner annular surface 16. A similar orifice is provided by the conical surface 18. These annular orifices each vary in size from a maximum at the plane 15 to a minimum at the planes 17 and 19. The angle of tapering may vary to provide a force closure curve having desired characteristics to restrict movement of the liquid to the low pressure side of the piston and absorb substantially all of the kinetic energy of any impact that is developed in service.

While the invention has been shown and described in connection with specific structural features and with regard to specific structural elements and details it will be appreciated that changes may be made in the overall organization as well as in the individual elements. The length of the device may be altered and the angle of the conical surfaces may be varied. Such modifications and others may be made without departing from the spirit and the scope of the invention as set forth in the appended claims.

What I claim and desire to secure by Letters Patent is:

1. A hydraulic device for cushioning impacts comprising, a tubular housing member, a head member closing each of the opposite ends of said tubular housing member, a piston and piston rod assembly with piston rods extending through each of said head members, said tubular housing member having a diameter at a mid-portion greater than the diameter of said piston, inner surfaces on said tubular housing member of conical shape converging inwardly in proceeding towards each end from said mid-portion, circumferentially spaced enlargements at the ends of said tubular housing member having threaded openings for receiving fastening means joining said head members to said tubular housing member, longitudinally extending areas on said tubular member in alignment with the enlargements on the lower portion thereof each accommodating a longitudinally extending passage, each head member having ducts leading downwardly from the vicinity of the piston rod, said tubular housing member having openings therein in communication with said ducts and said passages, and said tubular housing member having an opening leading from each passage at the mid-portion into the interior of said tubular housing member.

2. A hydraulic device for cushioning impacts according to claim 1 wherein the exterior surface of said tubular housing member between the lower enlargements is substantially flat.

3. A hydraulic device according to claim 1 wherein the passages are circumferentially spaced from each other by approximately ninety degrees.

4. A hydraulic device for cushioning impacts comprising, a tubular housing member, a head member closing each end of said tubular housing member, a piston and piston rod assembly with piston rods extending through said head members, said tubular housing member having a diameter at a mid-portion thereof greater than the diameter of said piston, inner surfaces on said housing member of conical shape converging inwardly in proceeding towards each end from said mid-portion, circumferentially spaced ears at the ends of an upper portion of said tubular housing member having threaded openings, circumferentially spaced enlargements at the ends of a lower portion of said tubular housing member having threaded openings, fastening means extending through said head members into said threaded openings joining said head members to said tubular housing member, longitudinally extending wall thickened areas on said tubular housing member in alignment with said enlargements each accommodating a longitudinally extending passage, each head member having a channel therein open to the associated piston rod, each head member having ducts leading downwardly from the respective channels, said tubular housing member having openings therein in communication with said ducts and said passages, and said tubular housing member having an opening leading from each passage at the mid-portion into the interior of said tubular housing member.

5. A hydraulic device for cushioning impacts comprising, a tubular housing member, a head member closing each of the opposite ends of said tubing member, a piston and piston rod unit with piston rods extending through each of said head members, said tubular member having a diameter at a mid-portion greater than the diameter of said piston, inner surfaces on said tubular housing member of substantially conical shape converging inwardly in proceeding towards each end from said mid-portion, means securing said head members to said tubular housing member, a longitudinally extending area along a lower portion of said tubular housing member accommodating a longitudinally extending passage, each head member having a duct leading downwardly from the vicinity of said piston rod, said tubular housing member having openings therein in communication with said ducts and said passage, and said tubular housing member having an opening leading from said passage at the mid-portion into the interior of said tubular housing.

6. A hydraulic device for cushioning impacts comprising, a tubular housing member, head members carried by and closing opposite ends of said tubing member, a piston and piston rod assembly with piston rods extending through said head members, said tubular housing member having a diameter at a mid-portion greater than the diameter of said piston, inner surfaces on said tubular housing member of substantially conical shape converging inwardly in proceeding towards each end from said mid-portion, said tubular housing member having a longitudinal passage therein extending from one head member to the other, each head member having a duct leading downwardly from the vicinity of said piston rod, said tubular housing member having openings therein in communication with said ducts and said passage, and said tubular housing member having an opening leading from said passage at the mid-portion into the interior of said tubular housing.

References Cited in the file of this patent
UNITED STATES PATENTS

| | | |
|---|---|---|
| 1,141,696 | Fernanzo | June 1, 1915 |
| 1,216,221 | Erickson et al. | Feb. 13, 1917 |
| 1,880,234 | Bullock et al. | Oct. 4, 1932 |